(12) United States Patent
Levine et al.

(10) Patent No.: US 7,185,200 B1
(45) Date of Patent: Feb. 27, 2007

(54) SERVER-SIDE WATERMARK DATA WRITING METHOD AND APPARATUS FOR DIGITAL SIGNALS

(75) Inventors: Earl Levine, Palo Alto, CA (US); Philip R. Wiser, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/389,842

(22) Filed: Sep. 2, 1999

(51) Int. Cl.
*H04L 9/00* (2006.01)

(52) U.S. Cl. ............ 713/176; 713/187; 713/190; 382/100; 382/232; 704/273

(58) Field of Classification Search ............ 713/201, 713/200; 382/100, 232
See application file for complete search history.

(56) References Cited

U.S. PATENT DOCUMENTS

| | | | | |
|---|---|---|---|---|
| 5,418,713 A * | 5/1995 | Allen | ............ | 705/32 |
| 5,636,276 A * | 6/1997 | Brugger | ............ | 705/54 |
| 5,734,823 A * | 3/1998 | Saigh et al. | ............ | 709/229 |
| 5,734,891 A * | 3/1998 | Saigh | ............ | 707/10 |
| 5,748,783 A * | 5/1998 | Rhoads | ............ | 382/232 |
| 5,794,217 A * | 8/1998 | Allen | ............ | 705/27 |
| 5,889,868 A * | 3/1999 | Moskowitz et al. | ............ | 713/176 |
| 5,905,800 A * | 5/1999 | Moskowitz et al. | ............ | 380/28 |
| 6,332,194 B1 * | 12/2001 | Bloom et al. | ............ | 713/176 |
| 6,341,350 B1 * | 1/2002 | Miyahara et al. | ............ | 713/176 |
| 6,404,898 B1 * | 6/2002 | Rhoads | ............ | 713/176 |
| 6,425,081 B1 * | 7/2002 | Iwamura | ............ | 713/176 |
| 6,453,420 B1 * | 9/2002 | Collart | ............ | 713/201 |
| 6,522,767 B1 * | 2/2003 | Moskowitz et al. | ............ | 382/100 |
| 2005/0050332 A1 * | 3/2005 | Serret-Avila et al. | ............ | 713/176 |
| 2005/0066181 A1 * | 3/2005 | Burns | ............ | 713/187 |

\* cited by examiner

*Primary Examiner*—Syed A. Zia
(74) *Attorney, Agent, or Firm*—Lee & Hayes, PLLC

(57) ABSTRACT

A digitized signal is published with a blank watermark, i.e., a watermark which contains no specific watermark data, and a server computer system encodes specific watermark data into the watermark signal for each delivery of the digitized signal. A basis signal which is used to watermark a digitized signal is predetermined to enable embedding of transaction-specific watermark data to be embedded in the subject signal with minimal processing resources. Since the basis signal generally accounts for the majority of the processing resources required to watermark the subject signal, only a relatively small portion of the requisite processing resources are used to embed transaction-specific watermark into the subject signal.

30 Claims, 11 Drawing Sheets

SERVER-SIDE WATERMARK DATA WRITING METHOD AND APPARATUS FOR DIGITAL SIGNALS

CROSS-REFERENCE TO RELATED APPLICATIONS

The present application is related to the following applications which were filed on Oct. 14, 1998 and which are incorporated herein in their entirety by reference: (i) patent application Ser. No. 09/172,583, entitled "Robust Watermark Method and Apparatus for Digital Signals" by Earl Levine, now U.S. Pat. No. 6,330,673; (ii) patent application Ser. No. 09/172,936, entitled "Robust Watermark Method and Apparatus for Digital Signals" by Earl Levine and Jason S. Brownell, now U.S. Pat. No. 6,209,094; (iii) patent application Ser. No. 09/172,935, entitled "Robust Watermark Method and Apparatus for Digital Signals" by Earl Levine, now U.S. Pat. No. 6,345,100; (iv) patent application Ser. No. 09/172,937, entitled "Secure Watermark Method and Apparatus for Digital Signals" by Earl Levine, now U.S. Pat. No. 6,320,965; and (v) patent application Ser. No. 09/172,922, entitled "Efficient Watermark Method and Apparatus for Digital Signals" by Earl Levine, now U.S. Pat. No. 6,219,634.

FIELD OF THE INVENTION

The present invention relates to digital signal processing and, in particular, to a particularly robust and efficient watermark mechanism by which identifying data can be encoded into digital signals such as audio or video signals such that the identifying data are not perceptible to a human viewer of the substantive content of the digital signals yet are retrievable and are sufficiently robust to survive other digital signal processing.

BACKGROUND OF THE INVENTION

Video and audio data have traditionally been recorded and delivered as analog signals. However, digital signals are becoming the transmission medium of choice for video, audio, audiovisual, and multimedia information. Digital audio and video signals are currently delivered widely through digital satellites, digital cable, and computer networks such as local area networks and wide area networks, e.g., the Internet. In addition, digital audio and video signals are currently available on digital media such as audio compact discs, digital audio tape (DAT), minidisc, and laserdisc and digital video disc (DVD) video media. As used herein, a digitized signal refers to a digital signal whose substantive content is generally analog in nature, i.e., can be represented by an analog signal. For example, digital video and digital audio signals are digitized signals since video images and audio content can be represented by analog signals.

A significant disadvantage resulting from the current tremendous growth of digitally stored and delivered audio and video is that digital copies which have exactly the same quality as the original digitized signal can easily be made and distributed without authorization notwithstanding illegality of such copying. The substantive content of digitized signals can have significant proprietary value which is susceptible to considerable diminution as a result of unauthorized duplication.

It is therefore desirable to include identifying data in digitized signals having valuable content such that duplication of the digitized signals also duplicates the identifying data and the source of such duplication can be identified. The identifying data should not result in humanly perceptible changes to the substantive content of the digitized signal when the substantive content is presented to a human viewer as audio and/or video presentations. Since substantial value is in the substantive content itself and in its quality, any humanly perceptible degradation of the substantive content substantially diminishes the value of the digitized signal. Such imperceptible identifying data included in a digitized signal is generally known as a watermark.

In general, adding a watermark to a digitized signal requires significant resources, often exceeding the capacity of server computer systems which deliver digitized signals to individual purchasers. In particular, such server computer systems are typically required to deliver many digitized products simultaneously and have insufficient resources to also add watermarks to those digitized signals prior to, or during, delivery. As a result, watermarks are typically added once by a publishing computer system and the watermarked digitized signal is placed on the server computer system for delivery. The primary disadvantage of such a system is that all copies of a watermarked digitized signal have identical watermark data. Accordingly, a source of unauthorized copies of a watermarked digitized signal cannot generally be determined from such a watermark.

What is needed, therefore, is a watermark system in which identifying data can be securely and robustly included in a digitized signal in a particular efficient manner such that a server computer system can add such data for each delivery of the digitized signal.

SUMMARY OF THE INVENTION

In accordance with the present invention, a basis signal which is used to watermark a digitized analog signal (the subject signal) is predetermined to enable embedding of transaction-specific watermark data in the subject signal with minimal processing resources. Since the basis signal generally accounts for the majority of the processing resources required to watermark the subject signal, only a relatively small portion of the available processing resources are used to embed transaction-specific watermark data into the subject signal. The transaction-specific watermark data is specific to the particular delivery of the digitized signal such that unauthorized copies can identify an authorized copy of the signal from which the unauthorized copies were made.

From the basis signal and the subject signal, two signal streams are created: one representing a first logical value, e.g., a logical "0", embedded into the subject signal and one representing a second logical value, e.g., a logical "1", embedded into the subject signal. The two signal streams are divided into segments and the segments are combined into a composite signal.

The composite signal can be constructed of composite frames, each of which includes frames constructed of segments of each of the two signal streams. The frames of a composite frame represented various permutations of overlapping segments of the two signal streams. For example, if a particular composite frame corresponds to two consecutive segments of the subject signal and thus two consecutive segments of the two signal streams, the composite frame can include four frames in which the two corresponding segments represent the following respective logical values: (i) "0" and "0", (ii) "0" and "1", (iii) "1" and "0", and (iv) "1" and "1". In forming a watermarked version of the subject signal to embed therein a watermark signal corresponding to transaction-specific data, the transaction specific data is mapped to the composite signal and, specifically to the composite frame. The one of the frames of the composite frame, which corresponds to the transaction specific data is selected and included in the watermarked signal. As a result, the quick watermarking process is reduced to simply forming transaction-specific data and selecting pre-existing frames according to the transaction-specific data. Relatively little processing resources are required.

In addition, the frames of a composite frame can be compressed such that the watermarked signal is compressed when assembled from the compressed frames of the various composite frames.

DETAILED DESCRIPTION

Figure 1:
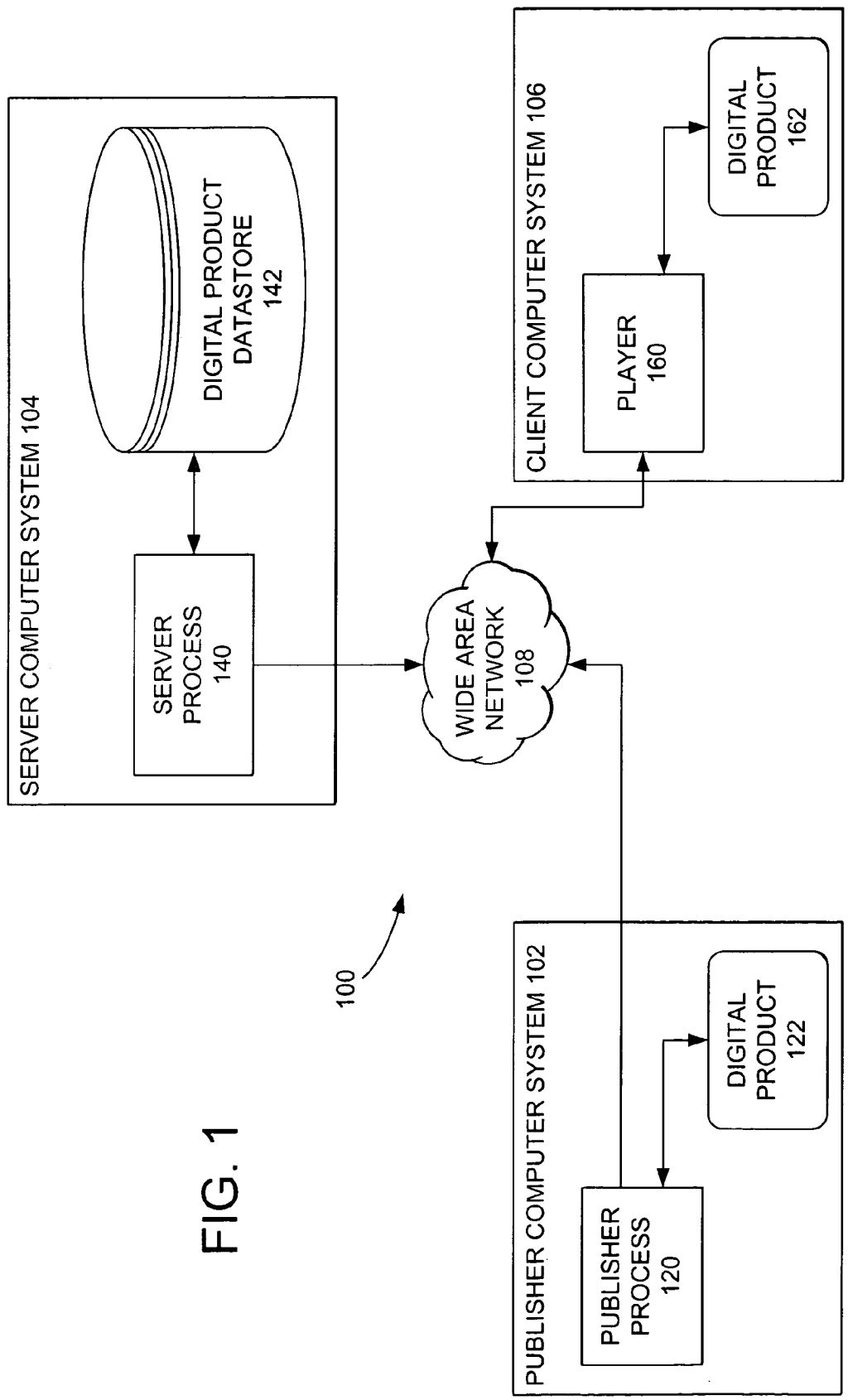
FIG. 1 is a block diagram of a digital signal distribution system which uses transaction-specific watermarking in accordance with the present invention.

In accordance with the present invention, a digitized signal is published with a blank watermark, i.e., a watermark which contains no specific watermark data, and a server computer system encodes specific watermark data into the watermark signal for each delivery of the digitized signal. Since a very small portion of server processing resources are required to produce a watermarked digitized signal, the watermarking workload of the server computer system is relatively light.

Distribution System 100

A brief overview of a digital product distribution system 100 is helpful. A publisher computer system 102 produces a digital product 122, which is a digitized analog signal in this embodiment. Publisher computer system 102 also includes a publisher process 120 which sends digital product 122 through a wide area computer network 108 to a server computer system 104 for subsequent distribution. In accordance with the present invention, publisher process 120 also prepares a watermark basis signal for use by server computer system 104 in subsequently encoding watermark data using the basis signal to form a watermarked digital product.

Figure 2:
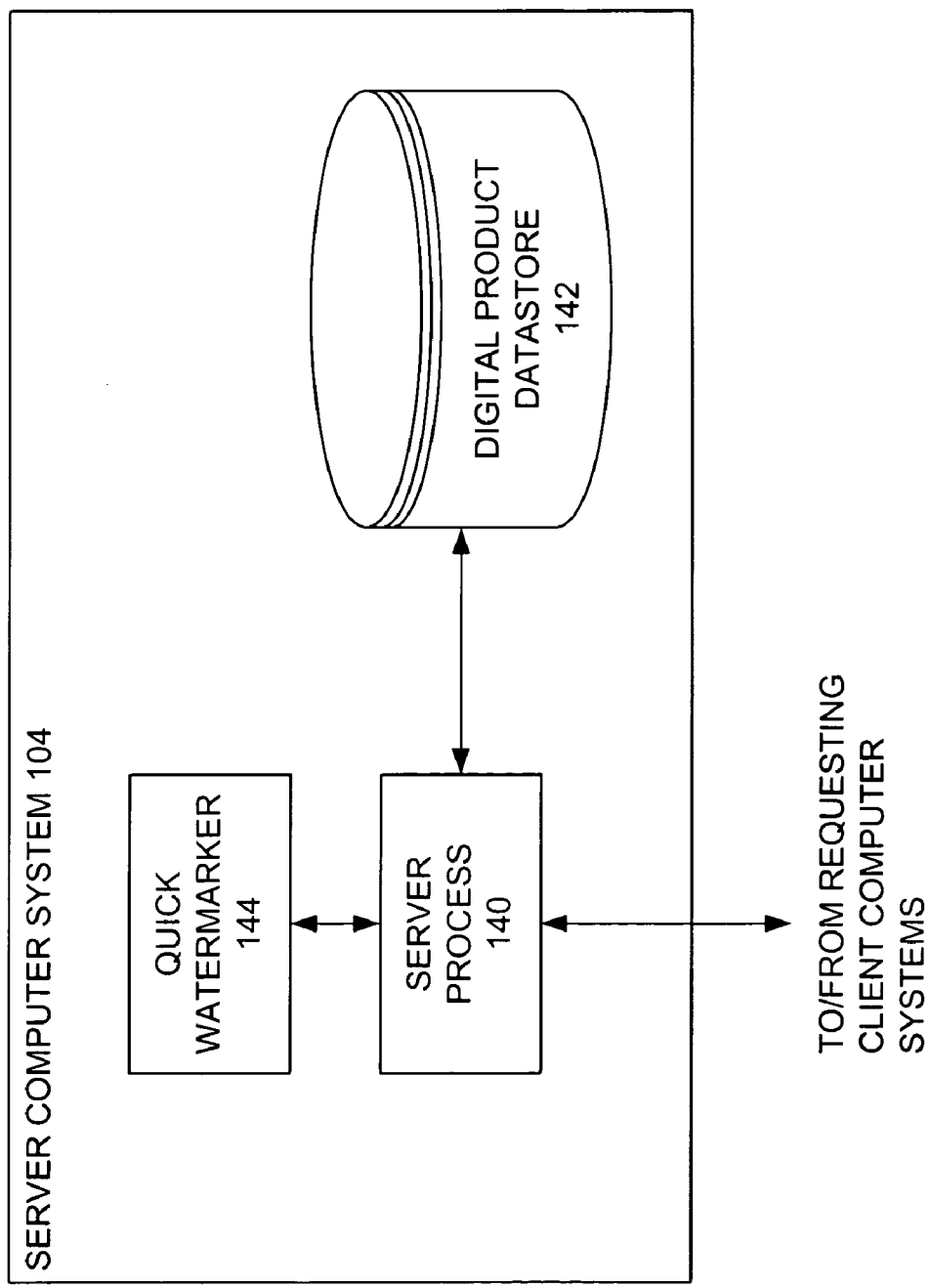
FIG. 2 is a block diagram of a server computer system of the distribution system of FIG. 1.

Server computer system 104 includes a server process 140 which receives digital product 122 and the watermark basis signal prepared by publisher process 120 and stores both in digital product datastore 142. Server process 140 also receives requests for digital products through wide area computer network 108 from client computer systems such as client computer system 106. In response to a particular request for a digital product, server process 140 selects data unique to the request and uses such data to encode a unique watermark for the requested digital product for that particular request. Server computer system 104 includes a quick watermarker 144 (FIG. 2) which performs the watermark data encoding and which adds the watermark to the requested digital product. Server process 140 sends the watermarked digital product to the request client computer system. Quick watermarker 144 is described more completely below and requires substantially fewer processing resources than conventional, complete watermarking systems such that server computer system 104 can serve many concurrent requests each of which requires watermarking of a respective digital product.

Client computer system 106 (FIG. 1) includes a player 160 which is all or part of one or more computer processes and presents the substantive content of the requested and received digital product 162. Because of the processing by server process 140, digital product 162, although derived from digital product 122, is distinctly watermarked relative to all other digital products derived from digital product 122. As a result, all unauthorized copies of digital product 162 can be traced back to digital product 162 and therefore to the user of client computer system 106.

Figure 3:
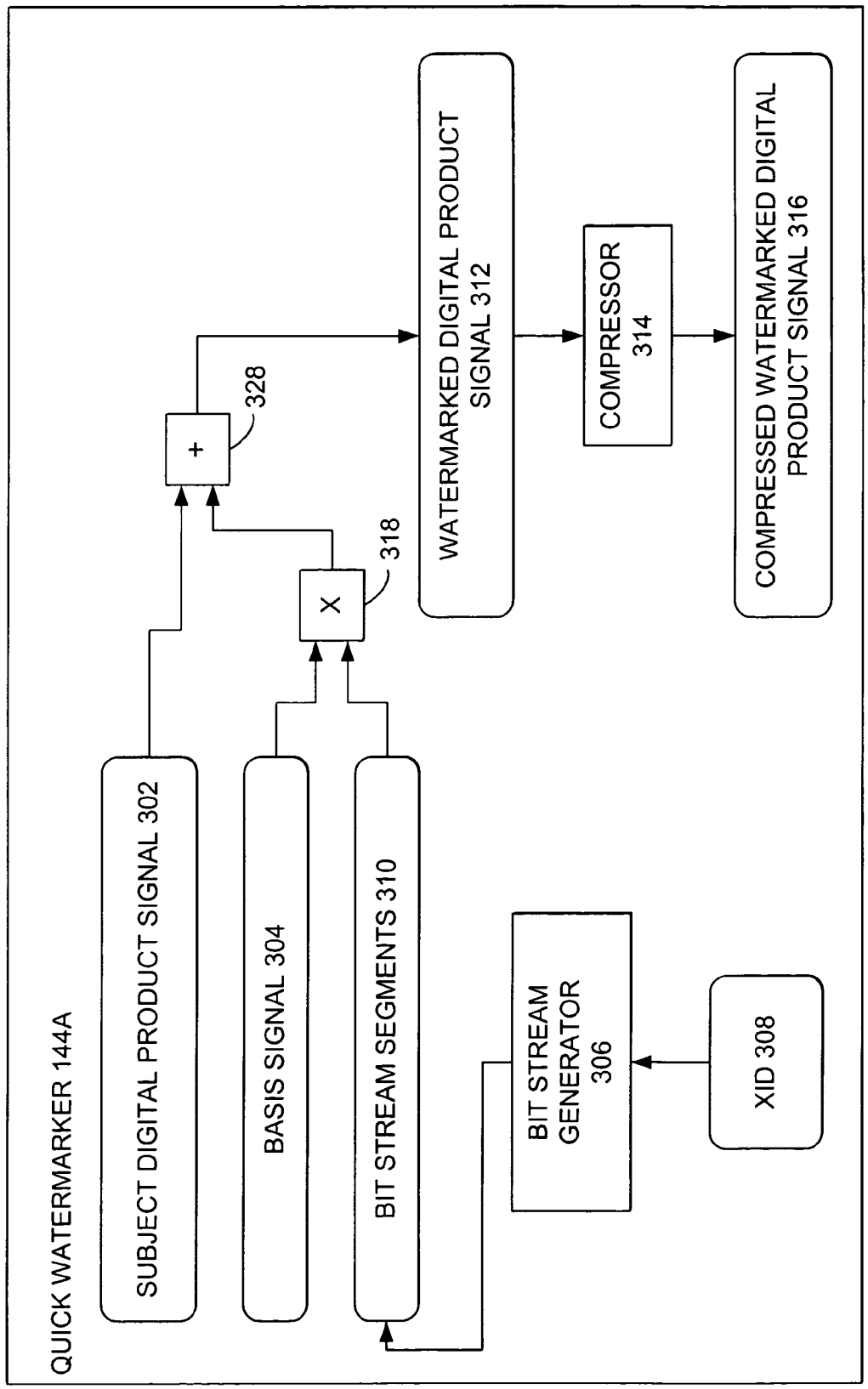
FIG. 3 is a block diagram of a first embodiment of a quick watermarker of the server computer system of FIG. 2 in accordance with the present invention.

A first embodiment of quick watermarker 144 (FIG. 2) is shown as quick watermarker 144A (FIG. 3). In this illustrative embodiment, quick watermarker 144A retrieves both the requested digital product, e.g., subject digital product signal 304 which is previously derived from subject digital product signal 302. Generation of a watermark basis signal from a digitized signal is described more completely in U.S. Pat. No. 6,209,094 entitled "Robust Watermark Method and Apparatus for Digital Signals" filed on Oct. 14, 1998 by Earl Levine and Jason S. Brownell (hereinafter the "'094 patent") and that description is incorporated herein by reference. In this embodiment, subject digital product signal 302 and basis signal 304 and uncompressed.

Quick watermarker 144A also includes a bit stream generator 306 which derives from unique transaction data 308 a stream of bit stream segments 310. Bit stream segments 310 define the manner in which unique transaction data 308 are represented using basis signal 304. In this embodiment, each segment of bit stream segments 310 represents whether a corresponding portion of basis signal 304 is to be added to or subtracted from a corresponding portion of subject digital product signal 302. In addition, each segment of bit stream segments 310 specifies tapering of basis signal 304 at segment boundaries to avoid audible effects at segment boundaries in the resulting watermarked signal. Furthermore, bit stream generator 306, pre-codes, convolutionally encodes, and cyclically scrambles unique transaction data 308 to reduce the likelihood that the resulting watermark can be detected, decoded, and/or removed without proper authorization. The segmenting, tapering of segment boundaries, pre-coding for inversion robustness, convolutional encoding and cyclical scrambling are all described more completely in the '094 patent and that description is incorporated herein by reference.

Quick watermarker 144A multiplies basis signal 304 and bit stream 310 using multiplier 318 and adds the resulting product to subject digital product signal 302 using adder 320 to produce watermarked digital product signal 312. Since the majority of processing required to form watermarked digital product signal 312 is in forming basis signal 304 from subject digital product signal 302 and since basis signal 304 is formed prior to receipt by quick watermarker 144A, formation of watermarked digital product signal 312 requires relatively little processing resources. Accordingly, watermarking of subject digital product signal 302 can be performed by server computer system 104 (FIG. 1) and can therefore use unique data for each transaction served as unique transaction data 308 (FIG. 3). Thus, any unauthorized copies of watermarked digital product signal 312 can be traced to a specific purchaser.

Quick watermarker 144A includes a compressor 314 which compresses watermarked digital product signal 312 using conventional techniques to form a compressed watermarked product signal 316 which is ready for delivery through wide area computer network 108 (FIG. 1).

Figure 4:
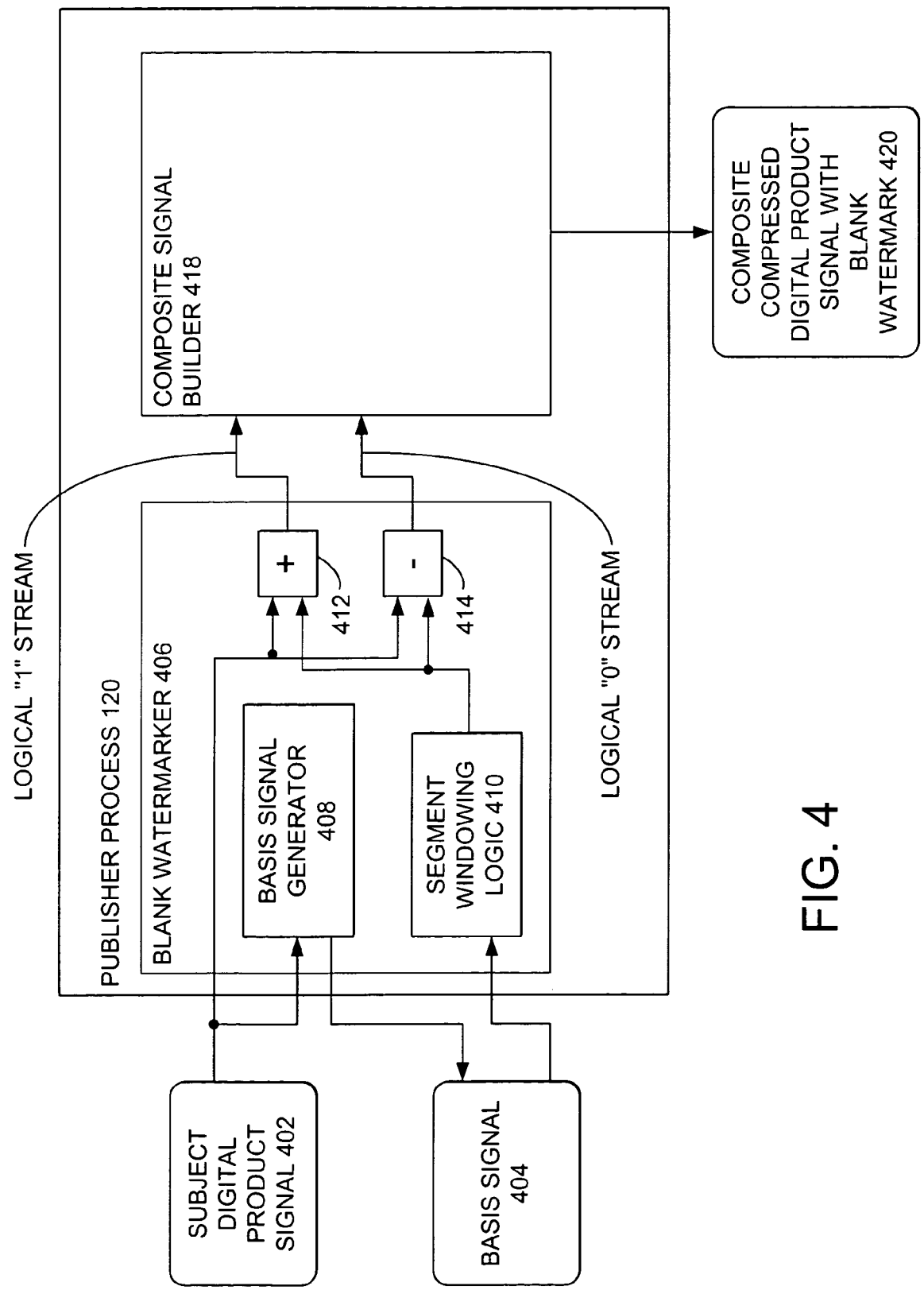
FIG. 4 is a block diagram of a publisher process in accordance with a second embodiment of the present invention.

In a more complex and more efficient embodiment, publisher process 120 performs compression processing in addition to formation of a basis signal corresponding to the subject digital product signal. Referring to FIG. 4, publisher process 120 includes a blank watermarker 406 which in turn includes a basis signal generator 408. Basis signal generator 408 receives a subject digital product signal 402 and produces therefrom a basis signal 404 in the manner described more completely in the '094 patent and that description is incorporated herein by reference. Blank watermarker 406 also includes segment windowing logic 410 which divides basis signal 404 into logic segments and tapers basis signal 404 at segment boundaries to prevent audible effects at basis signal boundaries. Division into segments and tapering at segment boundaries are described more completely in the '094 patent and that description is incorporated herein by reference.

Blank watermarker 406 produces two (2) digital signal streams, one representing a stream of logical "1" bits and one representing a stream of logical "0" bits. As described more completely below, portions of these two streams can be combined to form a watermarked digital product signal with a watermarked signal representing whatever watermark data is desired. Blank watermarker 406 includes an adder 412 which adds segmented basis signal from segment window logic 410 to subject digital product signal 402. Blank watermarker 406 similarly includes a subtractor 414 which subtracts segmented basis signal of segment window logic 410 from subject digital product signal 402.

Publisher process 120 includes a composite signal builder 418 which builds a composite compressed digital product signal with blank watermark 420, which in turn is sometimes referred to as composite signal 420. Composite signal builder 418 is shown in greater detail in FIG. 5.

Composite signal builder 418 includes two frame selectors 502 and 504. Composite signal 420 is compressed by composite signal builder 418 using a type of frame-based compression. Accordingly, analogous frames of both logical streams are selected by frame selectors 502 and 504. The selected frames are received by a composite frame builder 506 which builds composite frames 512 from a logical "1" frame from frame selector 502 and a logical "0" frame from frame selector 504. Composite frame builder 506 builds composite frames 512 such that all possible watermark data configurations can be coded from composite frames 512 as described more completely below.

To build composite frames 512, composite frame builder 506 is cognizant of segment boundaries used by segment windowing logic 410 (FIG. 4). In particular, composite frame builder 506 (FIG. 5) includes watermark segment logic 508 which determines segment boundaries in the same manner employed by segment window logic 410 (FIG. 4). In addition, composite frame builder 506 (FIG. 5) applies frame-based compression using a frame compressor 510.

Figure 6:
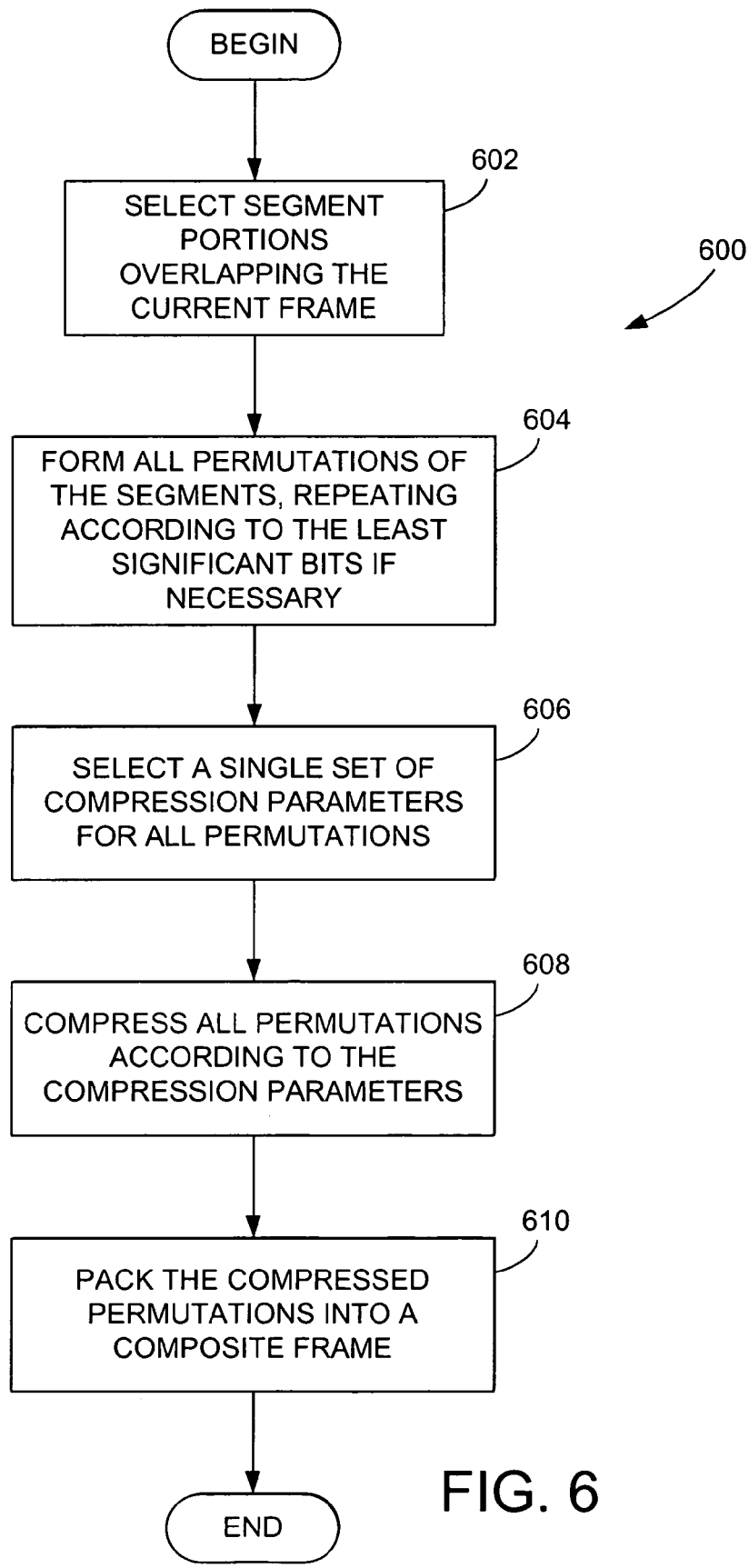
FIG. 6 is a logic flow diagram of the building of composite frames by the composite signal builder of FIG. 5.

Composite frame builder 506 constructs frames 516 according to logic flow diagram 600 (FIG. 6). Processing according to logic flow diagram 600 is further illustrated in FIG. 7.

Figure 7:
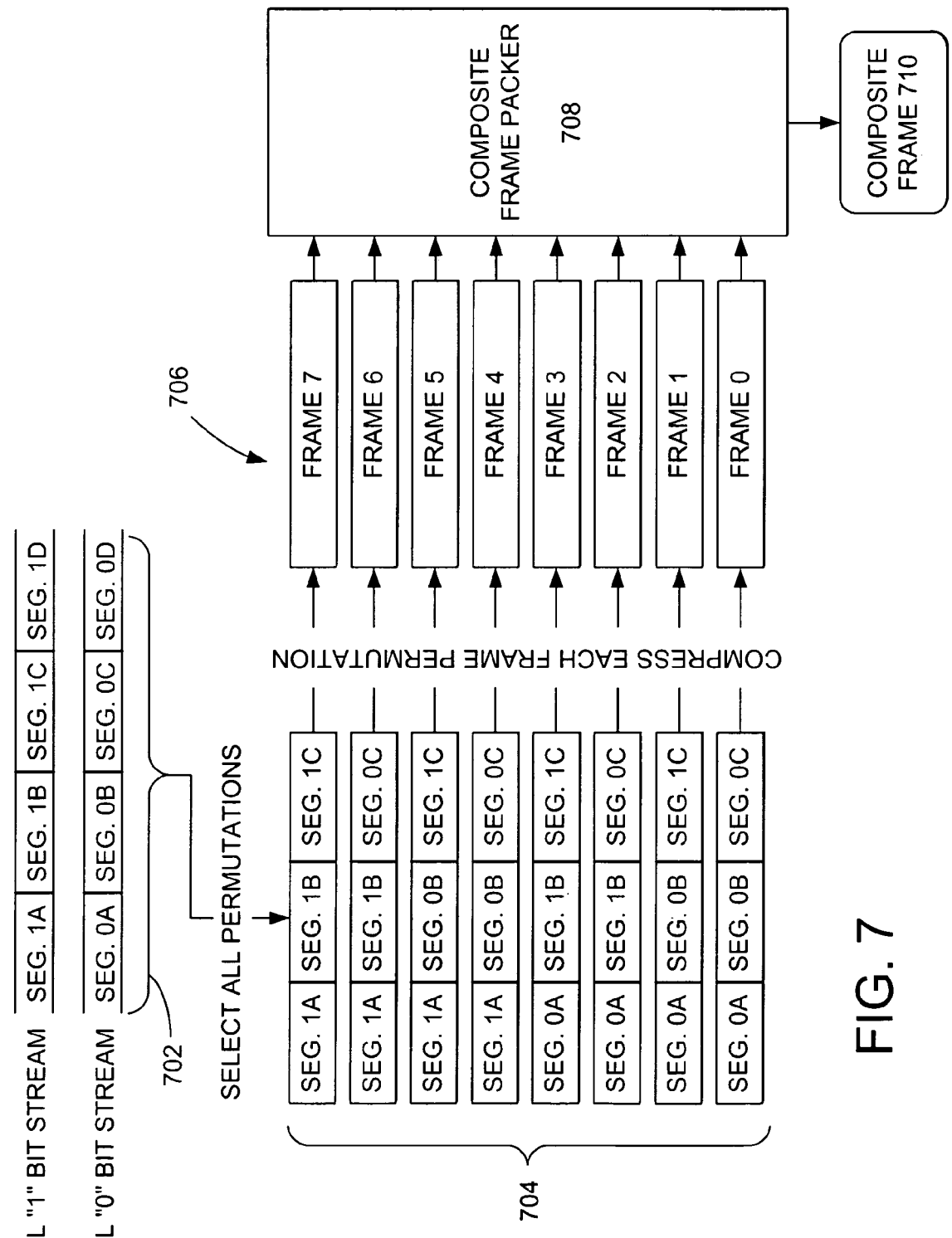
FIG. 7 is a block diagram illustrating the building of composite frames by the composite signal builder of FIG. 5.

In step 602 (FIG. 6), composite frame builder 506 (FIG. 5) determines which segments of the logical streams overlap the current frame. The current frame is the frame which has been received from frame selectors 502 and 504 and has not yet been packed into a composite frame. It is appreciated that, using concurrent processing techniques, more than one frame can be current. However, for simplicity, one frame is considered current at one time. In FIG. 7, the current frame is frame 702, which overlaps segments 1A–C of the logical "1" stream and segments 0A–C of the logical "0" stream.

Figure 5:
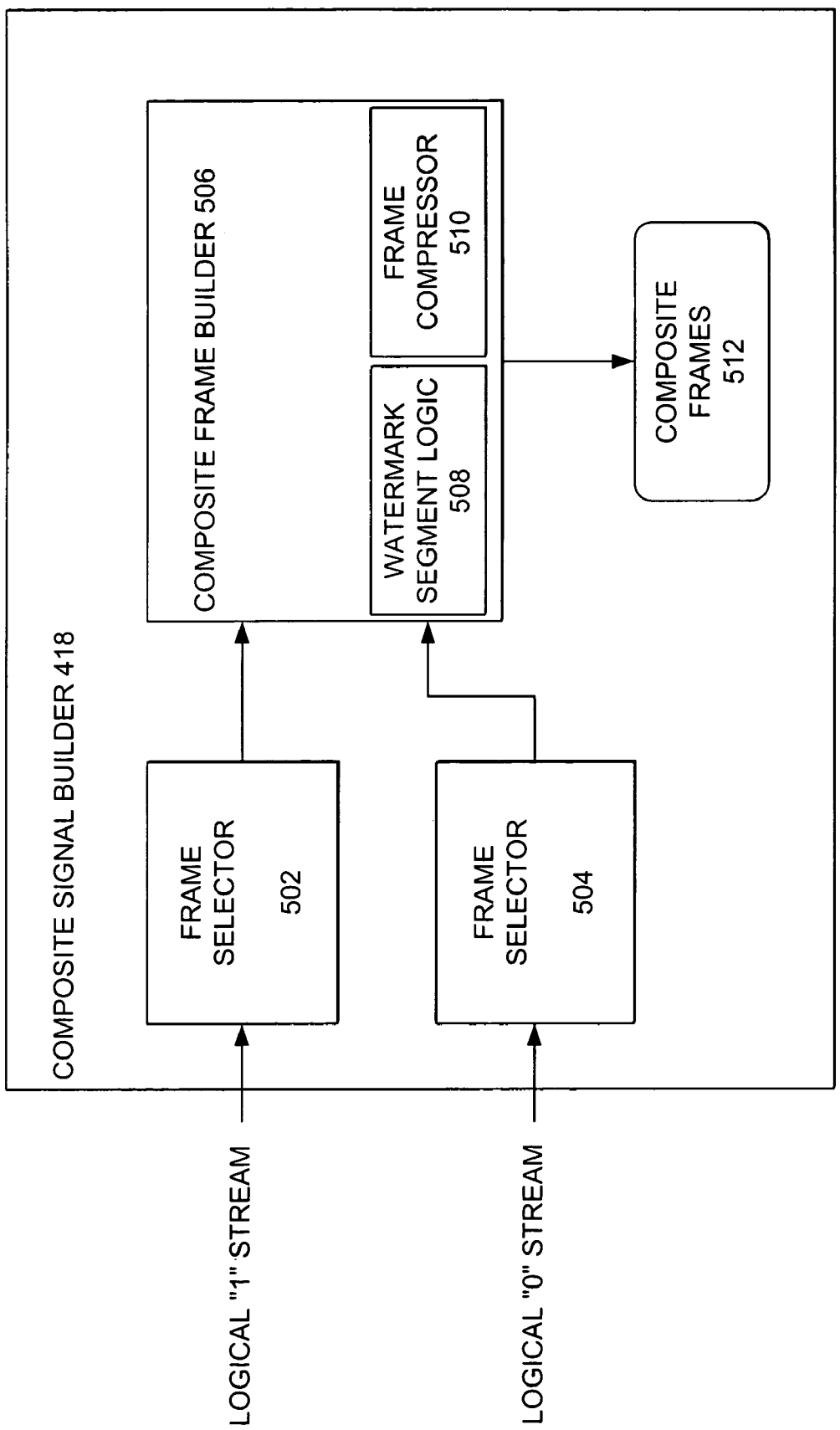
FIG. 5 is a block diagram of a composite signal builder of the publisher process of FIG. 4.

In step 604 (FIG. 6), composite frame builder 506 (FIG. 5) forms all permutations of the corresponding segments of the two streams. For example, composite frame builder 506 forms frame permutations 704 which include a separate frame permutation for each possible combination of watermark data that can be represented in segments 1A–C. For example, frame permutations 704 represent, from top to bottom, the following logical bit stream segments of watermark data: "111," "110,", "101,", "100," "011," "010, " "001," and "000." All of frame permutations 704 are eventually represented in composite frame 710, which is included in composite frames 512 (FIG. 5).

It is possible that different frames received from frame selectors 502 and 504 will overlap different numbers of segments. For example, a subsequently received frame might overlap only two segments. Frame permutations 704 are equal in number to $2^n$ where n is the maximum number of segments which can overlap a frame. In this illustrative example, the maximum number of segment which can overlap a frame is three. Accordingly, there are eight frame permutations 704.

When a frame overlaps fewer than the maximum number of segments, the frame permutations are repeated to form eight frame permutations 704. Specifically, the four possible frame permutations would represent the following logical bit stream segments of watermark data: "11," "10," "01," and "00," By repeating these permutations, frame permutations 704 would represent the following logical bit stream segments of watermark data: "11," "10," "01," "00," "11," "10," "01," and "00." Thus, the appropriate frame permutation can be selected later by reference to only the two least significant bits of a three-bit logical watermark data window.

In step 606 (FIG. 6), composite frame builder 506 (FIG. 5) selects compression parameters for all frame permutations 704 (FIG. 7). Since basis signal 404 (FIG. 4) has low energy relative to subject digital product signal 402, the two logical streams, and therefore frame permutations 704 (FIG. 7) are not terribly different from one another. Accordingly, compression parameters which are relatively optimum for all frame permutations 704 can be determined. In one embodiment, optimum compression parameters are determined for each individual one of frame permutations 704 and are averaged to provide a single set of compression parameters for the entire group of frame permutations 704.

The compression parameters include quantization parameters in this illustrative embodiment.

In step 608 (FIG. 6), composite frame builder 506 (FIG. 5) compresses all frame permutations 704 (FIG. 7) using the compression parameters determined in step 606 (FIG. 6). The results are compressed frames 706 (FIG. 7). Frame-based compression used in step 608 (FIG. 6) is conventional and can be, for example, the Advanced Audio Coding (AAC) frame-based compression.

Figure 8:
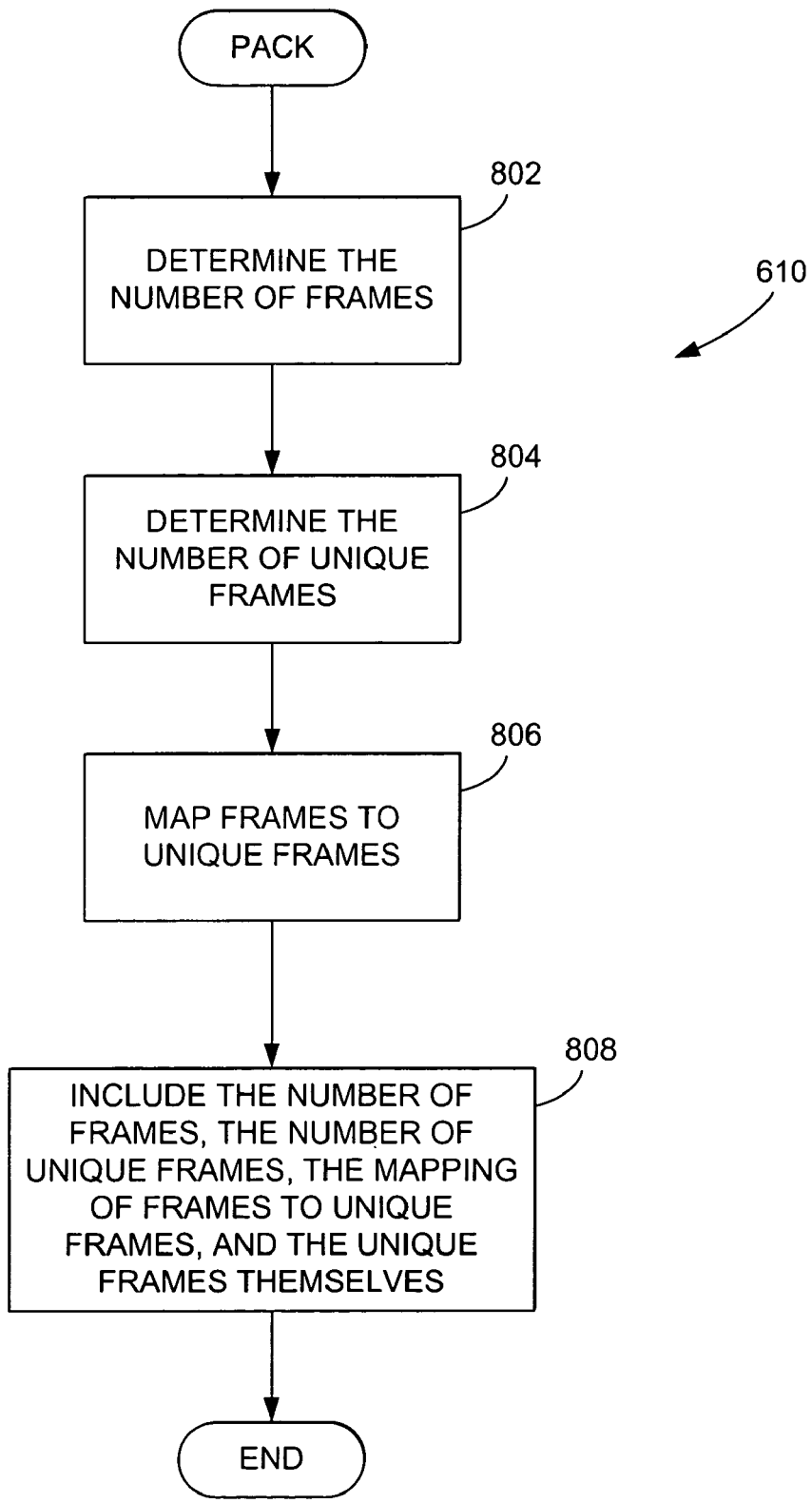
FIG. 8 is a logic flow diagram of the packing of composite frames by a composite frame packer of FIG. 7.

In step 610 (FIG. 6), a composite frame packer 708 (FIG. 7) of composite frame builder 506 (FIG. 5) packs compressed frames 706 (FIG. 7) to form composite frame 710. Step 610 (FIG. 6) is shown in greater detail as logic flow diagram 610 (FIG. 8).

In step 802 (FIG. 8), composite frame packer 708 (FIG. 7) determines the total number of compressed frames 706 to be represented in composite frame 710. This number is typically predetermined and does not change. In this illustrative example, the total number of compressed frames 706 is $2^n$ where n is the maximum number of segments which can overlap a frame, i.e., eight (8) for example.

In step 804 (FIG. 8), composite frame packer 708 (FIG. 7) determines the number of unique ones of compressed frames 706. Compressed frames 706 can include equivalent compressed from either (i) replication of frame permutations formed in the manner described above with respect to step 604 (FIG. 6) or (ii) compression of portions of subject digital product signal 402 (FIG. 4) with such low energy that any watermark signal is so slight as to be non-existent. Coding of a watermark signal in a portion of subject digital product signal 402 with low energy can introduce audible effects to subject digital product signal 402. Mechanisms which enable a watermark signal to survive such low-energy portions are described in the '094 patent and that description is incorporated herein by reference. Low energy portions of subject digital product signal 402 can result in suppression of a watermark signal to such a degree that two or more of compressed frames 706 representing different watermark data can be equivalent and indistinguishable. Composite frame packer 708 recognizes equivalency of such compressed frames in addition to those which are equivalent through frame permutation repetition described above.

In step 806 (FIG. 8), composite frame packer 708 (FIG. 7) maps frame indices of composite frames to corresponding ones of the unique compressed frames recognized in step 804 (FIG. 4).

In step 808, composite frame packer 708 (FIG. 7) includes the following in composite frame 710: the number of compressed frames 706 determined in step 802 (FIG. 8), the number of unique compressed frames determined in step 804, data representing the mapping determined in step 806, and the unique compressed frames determined in step 804. Thus, representation of equivalent frames is avoided and composite frame 710 (FIG. 7) is relatively compact.

Further reduction in the size of composite frame 710 is achieved as a result of using a single set of compression parameters in forming compressed frames 706. In particular, a compressed frame typically includes data representing at least some of the compression parameters used to compress the frame. By using the same compression parameters in forming compressed frames 706, those compression parameters can be represented only once within composite frame 710.

Figure 9:
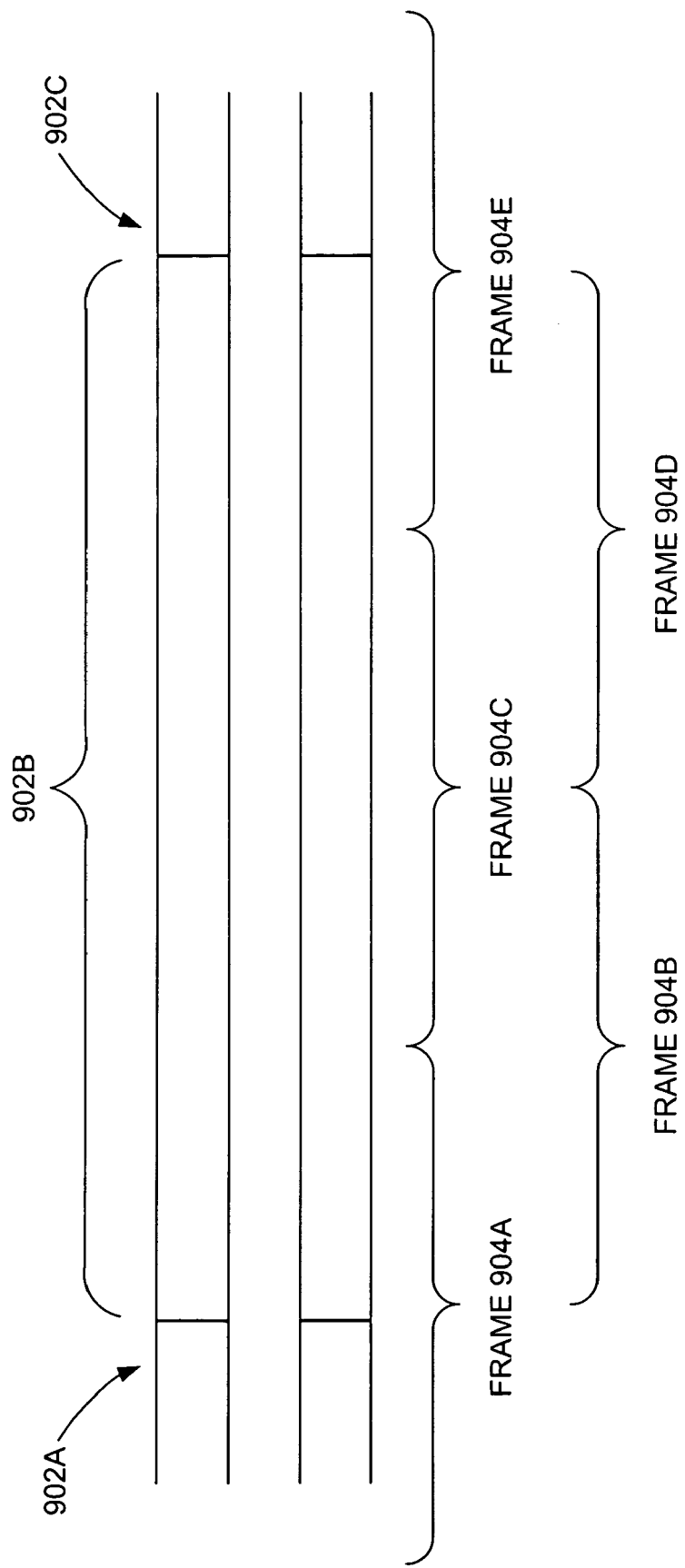
FIG. 9 is a block diagram illustrating the alignment of segment and frame boundaries.

Composite frame 710 includes multiple representations of a single compressed frame, each one corresponding to different watermark data. The number of multiple representations can be minimized by aligning segment boundaries with frame boundaries as illustrated in FIG. 9.

In this illustrative embodiment, frame compressor 510 (FIG. 5) implements the known AAC data compression algorithm which uses frames of 2,048 samples each. In addition, the frames overlap by 50%, i.e., by 1,024 samples. FIG. 9 is illustrative. For example, frames 904A–E each include 2,048 samples and overlap adjacent frames by 1,024 samples.

To minimize the number of alternative frame representations to be stored in composite frame 710 (FIG. 7), segment size is selected to be an integer multiple of the frame size and segments are aligned along frame boundaries. For example, segments 902A–C are each 4,096 samples in length. In addition, the boundary between segments 902A–B is aligned with the boundary between frame 904B and the frame immediately preceding frame 904A. Similarly, the boundary between segments 902B–C is aligned with the boundary between frame 904D and the frame immediately following frame 904E. The result is that frames 904B–D can each be represented by only two unique compressed frames within a composite frame such as composite frame 710 (FIG. 7). Frames 904A (FIG. 9) and 904E can each be represented by only four unique compressed frames. Accordingly, composite frame 710 (FIG. 7) is about 2.5 times as large as a single, watermarked, compressed frame, ignoring improvements achieved by recognizing equivalent frames and by encoding compressing parameters only once as described above. Since compression of some signals, such as audio signals, can achieve reductions in storage requirements by as much as 90–95%, computer and network resources required to transfer resulting composite signal 420 (FIG. 4) from publisher computer system 102 to server computer system 104 is still greatly reduced relatively to transferring uncompressed signals.

Alignment of frame and segment boundaries results in an additional improvement. Compressed frames, such as frame 904A, end to have higher energy toward the center of the compressed frames. As described above and in the '094 patent, segment windowing logic 410 (FIG. 4) tapers basis signal 404 at segment boundaries to prevent audible effects at basis signal boundaries. IT should also be noted that, aside form the basis signal, the two alternative signals, namely the logical "0" stream and the logical "1" stream, are identical. Accordingly, at the boundary between segments 902A and 902B, the two alternative signals are nearly identical. Thus, the energy of frame 904A is highest at a point at which the alternative signals are most identical. As a result, the likelihood that alternate versions of frame 904A are equivalent is improved and the number of unique versions of frame 904A can be reduced, forming an even more compact representation.

The processing by blank watermarker 406 (FIG. 4) and composite signal builder 418 of publisher process 120 also greatly reduces the amount of work required of quick watermarker 144, which is shown in greater detail as quick watermarker 144B (FIG. 10) in this embodiment.

Quick watermarker 144B retrieves composite signal 420 from digital product datastore 142 (FIG. 1). In particular, quick watermarker 144B (FIG. 10) processes a single composite frame 1004 at a time. It is appreciated that parallel and concurrent processing techniques can be used to process multiple composite frames concurrently; however, processing of a single composite frame at one time is described for simplicity.

Quick watermarker 144B includes transaction identification data 1008 which is relatively unique to a particular transaction in which server computer system 104 (FIG. 1) delivers a specific copy of the subject digital product signal to client computer system 106. Transaction identification data is sufficiently unique to identify this particular transaction and to identify client computer system 106 as the particular computer system to which the subject digital product signal is delivered. In a subsequent delivery of the same subject digital product signal, transaction identification data 1008 (FIG. 10) would be different to identify the subsequent transaction. Thus, quick watermarker 144B does not know the specific value of transaction identification data 1008 until a specific user has requested the subject digital product signal.

A watermark data bit stream generator 1010 of quick watermarker 144B generates a stream of watermark data bits from transaction identification data 1008 in the manner described above with respect to bit stream generator 306 (FIG. 3) except that segments of a basis signal are unnecessary and tapering of the basis signal at boundaries is also unnecessary since both segments segmentation of the basis signal and segment boundary tapering have been performed by segment windowing logic 410 (FIG. 4) of publisher process 120 in the manner described above. Watermark data bit stream generator 1010 pre-codes, convolutionally encodes, and cyclically scrambles transaction identification data 1008 to reduce the likelihood that the resulting watermark can be detected, decoded, and/or removed without proper authorization. The pre-coding for inversion robustness, convolutional encoding, and cyclical scrambling are all described more completely in the '094 patent and that description is incorporated herein by reference.

The watermark data generated by watermark data bit stream generator 1010 determine which of the alternative frame representations of composite frame 1004 is selected to be included in a resulting compressed, watermarked signal. Frame selection is performed by a frame selector 1006 of quick watermarker 144B. Frame selector 1006 is shown in greater detail in FIG. 11.

Frame selector 1006 includes a composite frame parser 1102 which parses composite frame 1004 to produce a mapper 1104 and unique frames 1106. Unique frames 1106 are the unique compressed frames included in composite frame 1004 as described above. Mapper 1104 receives a frame number and maps the frame number to an index into unique frames 1106.

Frame selector 1006 also includes segment logic 1110 which keeps track of segment boundaries as composite frames are processed. In particular, if composite frame 1004 represents one or more segments not represented in previously processed composite frames, a new bit from the watermark data bit stream of watermark data bit stream generator 1010 (FIG. 10) is shifted into a shift register 1112 (FIG. 11) for each such new segment. The new watermark data bits are shifted in, in sequence, as new least significant bits. Shift register 1112 has a length equal to the maximum number of segments which can overlap any composite frame.

Figure 10:
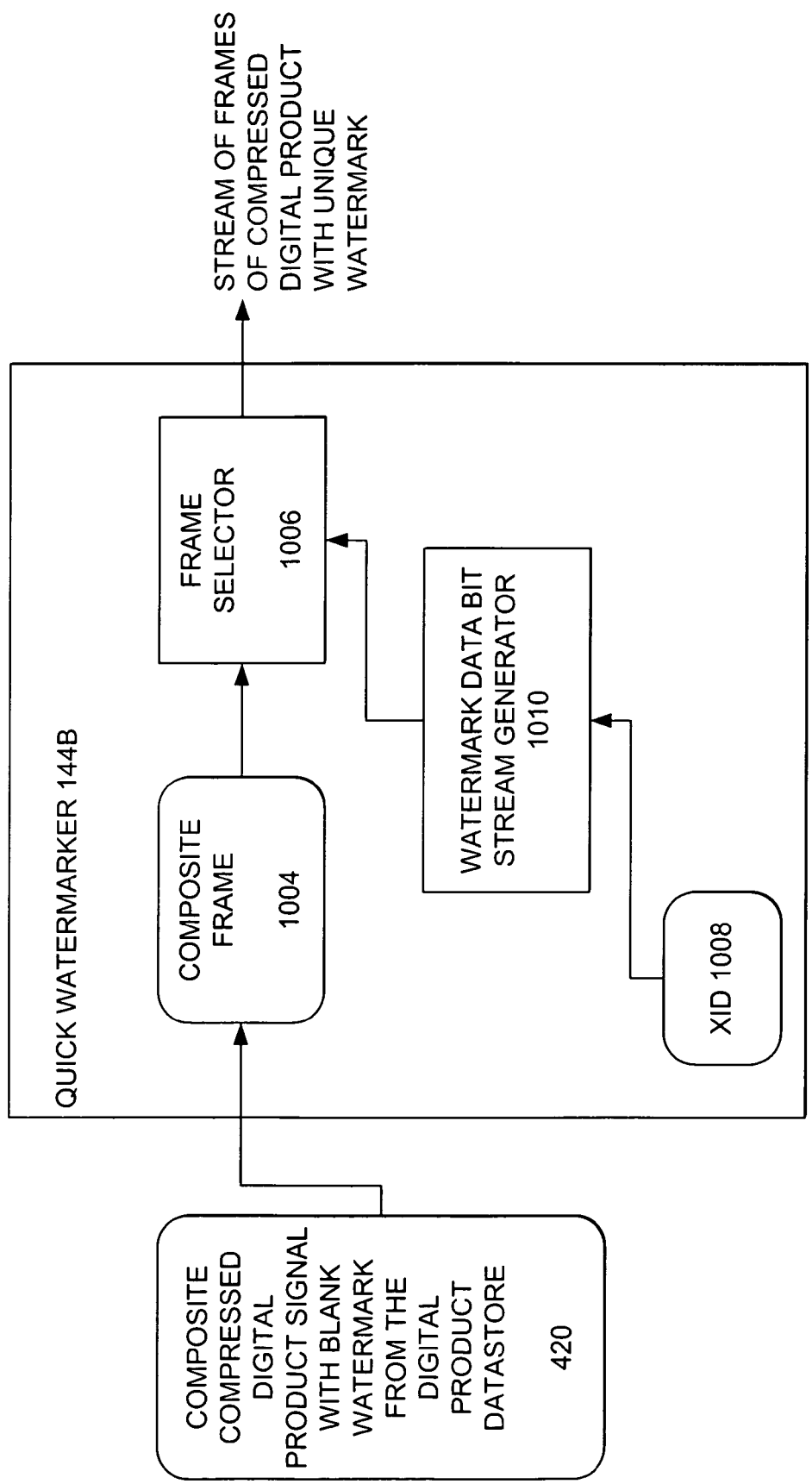
FIG. 10 is a block diagram of a quick watermarker in accordance with the second embodiment of the present invention.
Figure 11:
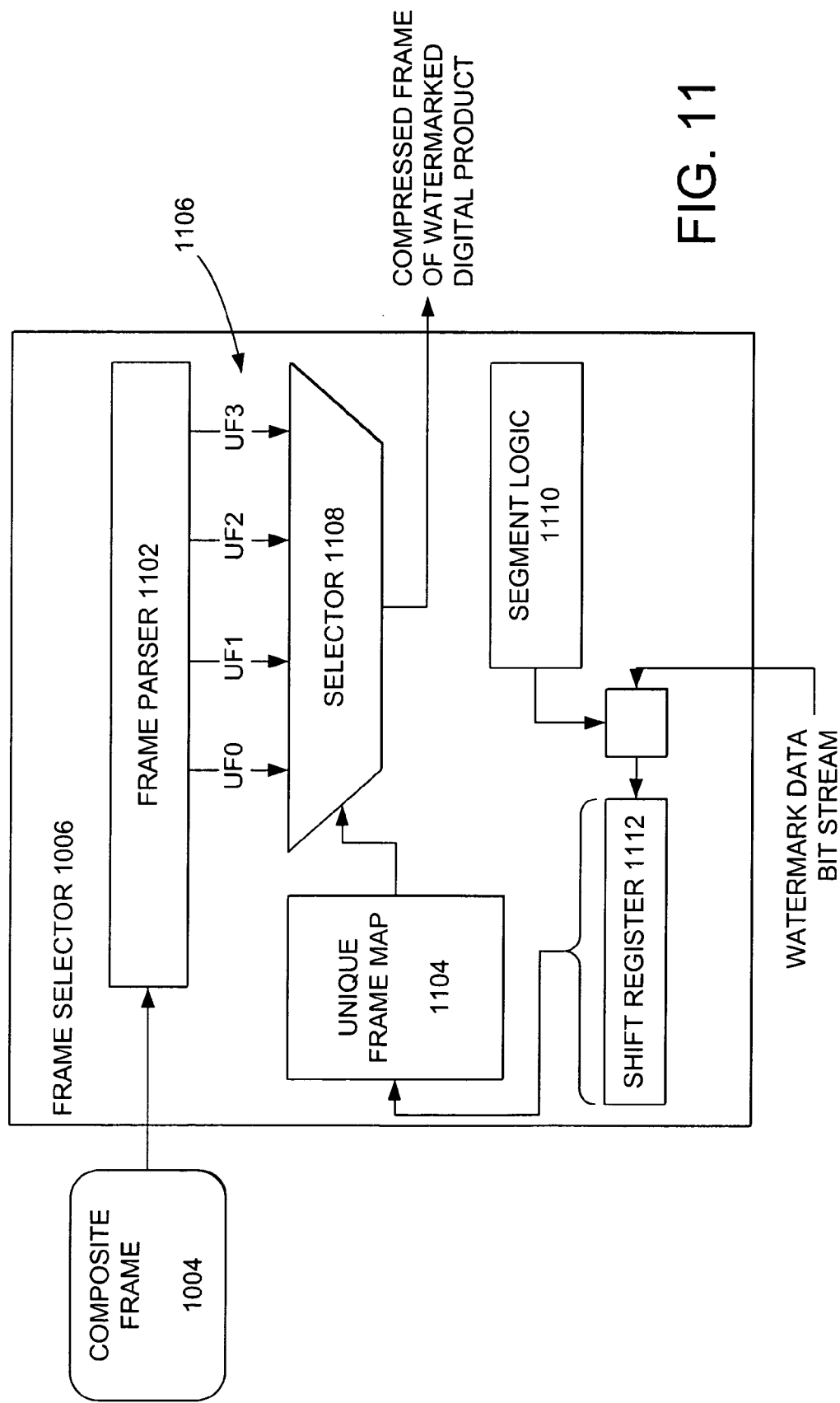
FIG. 11 is a block diagram of a frame selector of the quick watermarker of FIG. 10.

Consideration of the example of FIG. 9 facilitates understanding and appreciation of the operation of frame selector 1006 (FIG. 10). Upon receiving frame 904A (FIG. 9), segment logic 1110 (FIG. 11) determines that a new segment, i.e., segment 902B (FIG. 9), is represented by frame 904A. The previous least significant bit of shift register 1112 (FIG. 11) represented the watermark data bit for data to be encoded in segment 904A (FIG. 9). Segment logic 1110 (FIG. 11) causes another bit of the watermark data bit stream, e.g., one representing a watermark data bit corresponding to segment 902B (FIG. 9), to be shifted into the least significant bit of shift register 1112 (FIG. 11). Such shifts the previously least significant bit to the next more significant position within shift register 1112. In the illustrative example of FIG. 9, the most segments overlapped by a single frame, and therefore the length of shift register 1112 (FIG. 11) is two.

Thus, after shifting by segment logic 1110, the two bits stored in shift register 1112 represent the watermark data to be encoded in segments 902A–B. Mapper 1104 (FIG. 11) reads shift register 1112 and provides an index into unique frames 1106 according to the value of the bits of shift register 1112. The unique frame selected by selector 1108 according to the index provided by mapper 1104 represents encoding of the watermark data bits of shift register 1112 and is appended to a stream of selected frames. The stream of selected frames collectively form a compressed digital product signal which is watermarked according to transaction identification data 1008 (FIG. 10).

Next, in this illustrative example, frame selector 1006 processes frame 904B (FIG. 9). Segment logic 1110 (FIG. 11) determines that no new segment is represented by frame 904B and does not shift any new watermark data bits into shift register 1112. Thus, shift register 1112 contains the same data used to process frame 904A (FIG. 9). However, there are only two possible segment combinations that can be represented within frame 904B. As described above with respect to composite signal builder 418 (FIG. 4) and step 604 (FIG. 6), frame permutations are duplicated as necessary to create a maximum number of frame permutations. In the example of FIG. 9, the maximum number of frame permutations is four since a frame can represent at most two segments. Thus, in forming a composite frame representing frame 904B, composite signal builder 418 replicates frame permutations to make four frame permutations. In particular, composite signal builder 418 makes frame permutations representing a portion of segment 902B with a logical "1" encoding and representing a portion of segment 902B with a logical "0" encoding. Composite signal builder 418 (FIG. 4) uses the logical "1" frame permutation to represent watermark data of shift register 1112 (FIG. 11) having values of "11" and "01," i.e., with a least significant bit value of "1." Similarly, composite signal builder 418 (FIG. 4) uses the logical "0" frame permutation to represent watermark data of shift register 1112 (FIG. 11) having values of "10" and "00," i.e., with a least significant bit value of "0." Thus, regardless of the most significant bit in shift register 1112 during processing by frame selector 1006; mapper 1104 selects one of unique frames 1106 according to only the least significant bit of shift register 1112. The effect is that watermark data corresponding to segment 902A (FIG. 9) is ignored as a result of mapper 1104 (FIG. 11) mapping absolute frame reference numbers to an index within unique frames 1106.

The state of shift register 1112 is not changed during processing of frames 904C–D (FIG. 9). When frame 904E is processed, segment logic 1110 (FIG. 11) determines that one new segment is represented by the current composite frame and shifts a new watermark data bit into shift register 1112. The watermark data bit corresponding to segment 902A (FIG. 9) is shifted out of shift register 1112 (FIG. 11) and the two bits of shift register 1112 now represent segments 902B–C (FIG. 9), the former corresponding to the most significant bit of shift register 1112 (FIG. 11) and the latter corresponding to the least significant bit.

As frame selector 1006 processes composite frames in sequence, frame selector pieces together compressed, watermarked frames corresponding to logical "1" values or logical "0" a values according to watermark data bits generated by watermark data bit stream generator 1010 (FIG. 10). The processing by frame selector 1006 is very efficient, requiring neither basis signal generation nor compression as the various packed unique frames are already watermarked with preselected values and compressed.

The above description is illustrative only and is not limiting. The present invention is limited only by the claims which follow.

What is claimed is:

1. A method performed at a server computer, for tracking a requested signal, the method comprising:
receiving a request for the requested signal;
generating transaction identification data which identifies the received request;
including a pattern in the requested signal to form a watermarked signal using a predetermined basis signal previously derived from a digital product signal, wherein the transaction identification data can be derived from the pattern; further wherein the inclusion of the basis signal in the requested signal is designed to introduce no more than a predetermined maximum level of perceptibility to the requested signal, wherein the including comprises:
selecting watermarked signal fragments representing a first logical value for corresponding portions of the pattern which have the first logical value;
selecting watermarked signal fragments representing a second logical value for corresponding portions of the pattern which have the second logical value; and
combining the watermarked signal fragments representing the first and second logical values to form the watermarked signal.

2. The method of claim 1 where including comprises:
retrieving the basis signal; and
including the basis signal in the requested signal to form the watermarked signal in such a manner that the pattern is embedded in the watermarked signal and can be recognized in the watermarked signal.

3. The method of claim 2 wherein including the basis signal comprises:
logically dividing the basis signal into segments; and
for each segment of the basis signal,
adding the segment of the basis signal to a corresponding segment of the requested signal upon a condition in which a corresponding portion of the pattern has a first logical value; and
subtracting the segment of the basis signal from the corresponding segment of the requested signal upon a condition in which the corresponding portion of the pattern has a second logical value.

4. The method of claim 1 further comprising:
sending watermarked signal in response to the request for the requested signal.

5. The method of claim 1 wherein the watermarked signal fragments are compressed such that the watermarked signal fragments comprise the watermarked signal in a compressed form.

6. A method performed at a server computer, for enabling embedding of transaction-specific identification data into a requested signal, the method comprising:
logically dividing the requested signal into segments; for each segment,
embedding a first logical value in the segment to form a first embedded segment;
embedding a second logical value in the segment to form a second embedded segment;
including both the first and second embedded segments in a composite signal comprising
including the first embedded segment in a first frame;
compressing the first frame to form a first compressed frame;
including the second embedded segment in a second frame;
compressing the second frame to form a second compressed frame; and
including both the first and second compressed frames in the composite signal; and
for each of the segments of the requested signal:
selecting from first and second embedded segments of the composite signal according to a corresponding bit of the transaction-specific identification data.

7. The method of claim 6 further comprising:
combining the selected embedded segments of the composite signal to form a watermarked signal which includes the transaction-specific identification data embedded therein.

8. The method of claim 6 wherein including both the first and second embedded segments in a composite signal further comprises:
determining that the first and second compressed frames are equivalent; and
including a single compressed frame in the composite signal to represent both the first and second compressed frames.

9. A method performed at server computer, for embedding transaction-specific identification data into a requested signal, the method comprising:
retrieving a composite signal which includes, for each of one or more corresponding portions of the requested signal, a first marked segment which represents a first logical value embedded in the corresponding portion of the requested signal and a second marked segment which represents a second logical value embedded in the corresponding portion of the requested signal;
for each of the corresponding portions of the requested signal, selecting segments of the composite signal according to logical values of corresponding bits of the transaction-specific identification data; and
combining the selected segments to form a watermarked signal which includes the transaction-specific identification data embedded therein, wherein the watermarked signal is further formed using a predetermined basis signal previously derived from a digital product signal.

10. The method of claim 9 wherein the first and second marked segments are compressed such that watermarked signal formed by combining the selected segments is compressed.

11. A computer-readable storage medium on which is stored computer code which, when executed by a server-side computer, causes the computer to enable tracking a requested signal by:
receiving a request for the requested signal;
generating transaction identification data which identifies the received request;
including a pattern in the requested signal to form a watermarked signal using a predetermined basis signal, previously derived from a digital product signal, wherein the transaction identification data can be derived from the pattern; further wherein the inclusion of the basis signal in the requested signal is designed to introduce no more than a predetermined maximum level of perceptibility to the requested signal, wherein including comprises:
  selecting watermarked signal fragments representing a first logical value for corresponding portions of the pattern which have the first logical value;
  selecting watermarked signal fragments representing a second logical value for corresponding portions of the pattern which have the second logical value; and
  combining the watermarked signal fragments representing the first and second logical values to form the watermarked signal.

12. The computer-readable storage medium of claim 11 where including comprises:
  retrieving the basis signal; and
  including the basis signal in the requested signal to form the watermarked signal in such a manner that the pattern is embedded in the watermarked signal and can be recognized in the watermarked signal.

13. The computer-readable storage medium of claim 12 wherein including the basis signal comprises:
  logically dividing the basis signal into segments; and
  for each segment of the basis signal,
    adding the segment of the basis signal to a corresponding segment of the requested signal upon a condition in which a corresponding portion of the pattern has a first logical value; and
    subtracting the segment of the basis signal from the corresponding segment of the requested signal upon a condition in which the corresponding portion of the pattern has a second logical value.

14. The computer-readable storage medium of claim 11 wherein the computer code, when executed by the computer, further causes the computer to enable tracking a requested signal by:
  sending the watermarked signal in response to the request for the requested signal.

15. The computer-readable storage medium of claim 11 wherein the watermarked signal fragments are compressed such that combining the watermarked signals fragments forms the watermarked signal in a compressed form.

16. A computer-readable storage medium on which is stored computer code which, when executed by a server-side computer, causes the computer to enable embedding of transaction-specific identification data into a requested signal by:
  logically dividing the requested signal into segments;
  for each segment,
    embedding a first logical value in the segment to form a first embedded segment;
    embedding a second logical value in the segment to form a second embedded segment;
    including both the first and second embedded segments in a composite signal;
    combining the selected embedded segments of the composite signal to form a watermarked signal which includes the transaction-specific identification data embedded therein; and
  for each of the segments of the requested signal:
    selecting from first and second embedded segments of the composite signal according to a corresponding bit of the transaction-specific identification data.

17. The computer-readable storage medium of claim 16 wherein including both the first and second embedded segments in a composite signal comprises:
  including the first embedded segment in a first frame;
  compressing the first frame to form a first compressed frame;
  including the second embedded segment in a second frame;
  compressing the second frame to form a second compressed frame; and
  including both the first and second compressed frames in the composite signal.

18. The computer-readable storage medium of claim 17 wherein including both the first and second embedded segments in a composite signal further comprises:
  determining that the first and second compressed frames are equivalent; and
  including a single compressed frame in the composite signal to represent both the first and second compressed frames.

19. A computer-readable storage medium on which is stored computer code which, when executed by a server-side computer, causes the computer to enable embedding transaction-specific identification data into a requested signal by:
  retrieving a composite signal which includes, for each of one or more corresponding portions of the requested signal, a first marked segment which represents a first logical value embedded in the corresponding portion of the requested signal and a second marked segment which represents a second logical value embedded in the corresponding portion of the requested signal;
  for each of the corresponding portions of the requested signal, selecting segments of the composite signal according to logical values of corresponding bits of the transaction-specific identification data; and
  combining the selected segments to form a watermarked signal using a predetermined basis signal previously derived from a digital product signal, which includes the transaction-specific identification data embedded therein.

20. The computer-readable storage medium of claim 19 wherein the first and second marked segments are compressed such that watermarked signal formed by combining the selected segments is compressed.

21. A server computer comprising:
  a processor;
  a memory coupled to the processor; and
  a watermarker which executes in the processor from the memory and which, when executed, enables tracking of a requested signal by:
    receiving a request for the requested signal;
    generating transaction identification data which identifies the received request; and
    including a pattern in the requested signal to form a watermarked signal using a predetermined basis previously derived from a digital product signal, wherein the transaction identification data can be derived from the pattern; further wherein the inclusion of the basis signal in the requested signal is designed to introduce no more than a predetermined maximum level of perceptibility to the requested signal, wherein including comprises:
      selecting watermarked signal fragments representing a first logical value for corresponding portions of the pattern which have the first logical value;
      selecting watermarked signal fragments representing a second logical value for corresponding portions of the pattern which have the second logical value; and
      combining the watermarked signal fragments representing the first and second logical values to form the watermarked signal.

22. The computer system of claim 21 where including comprises:
   retrieving the basis signal; and
   including the basis signal in the requested signal to form the watermarked signal in such a manner that the pattern is embedded in the watermarked signal and can be recognized in the watermarked signal.

23. The computer system of claim 22 wherein including the basis signal comprises:
   logically dividing the basis signal into segments; and
   for each segment of the basis signal,
      adding the segment of the basis signal to a corresponding segment of the requested signal upon a condition in which a corresponding portion of the pattern has a first logical value; and
      subtracting the segment of the basis signal from the corresponding segment of the requested signal upon a condition in which the corresponding portion of the pattern has a second logical value.

24. The computer system of claim 21 wherein the watermarker, when executed, enables tracking of a requested signal by also:
   sending the watermarked signal in response to the request for the requested signal.

25. The computer system of claim 21 wherein the watermarked signal fragments are compressed such that combining the watermarked signals fragments forms the watermarked signal in a compressed form.

26. A server computer comprising:
   a processor;
   a memory coupled to the processor; and
   a blank watermarker which executes in the processor from the memory and which, when executed, enables embedding of transaction-specific identification data into a requested signal by:
      logically dividing the requested signal into segments;
      for each segment,
         embedding a first logical value in the segment to form a first embedded segment;
         embedding a second logical value in the segment to form a second embedded segment;
         including both the first and second embedded segments in a composite signal;
         combining the selected embedded segments of the composite signal to form a watermarked signal which includes the transaction-specific identification data embedded therein; and
      for each of the segments of the requested signal:
      selecting from first and second embedded segments of the composite signal according to a corresponding bit of the transaction-specific identification data.

27. The computer system of claim 26 wherein including both the first and second embedded segments in a composite signal comprises:
   including the first embedded segment in a first frame;
   compressing the first frame to form a first compressed frame;
   including the second embedded segment in a second frame;
   compressing the second frame to form a second compressed frame; and
   including both the first and second compressed frames in the composite signal.

28. The computer system of claim 27 wherein including both the first and second embedded segments in a composite signal further comprises:
   determining that the first and second compressed frames are equivalent; and
   including a single compressed frame in the composite signal to represent both the first and second compressed frames.

29. A server computer comprising:
   a processor;
   a memory coupled to the processor; and
   a watermarker which executes in the processor from the memory and which, when executed, embeds transaction-specific identification data into a requested signal by:
      retrieving a composite signal which includes, for each of one or more corresponding portions of the requested signal, a first marked segment which represents a first logical value embedded in the corresponding portion of the requested signal and a second marked segment which represents a second logical value embedded in the corresponding portion of the requested signal;
      for each of the corresponding portions of the requested signal,
         selecting segments of the composite signal according to logical values of corresponding bits of the transaction-specific identification data; and
         combining the selected segments to form a watermarked signal using a predetermined basis signal previously derived from a digital product signal, which includes the transaction-specific identification data embedded therein.

30. The computer system of claim 29 wherein the first and second marked segments are compressed such that watermarked signal formed by combining the selected segments is compressed.

* * * * *